(12) United States Patent
Ghanbari et al.

(10) Patent No.: US 12,399,016 B2
(45) Date of Patent: Aug. 26, 2025

(54) SYSTEMS AND METHODS FOR DETERMINING AND USING FLEET-SPECIFIC DRIVER PERFORMANCE

(71) Applicant: OMNITRACS, LLC, Dallas, TX (US)

(72) Inventors: Reza Ghanbari, San Diego, CA (US); Ashim Bose, Flower Mound, TX (US); Jason Palmer, Carlsbad, CA (US); David Wagstaff, Lake Forest, CA (US)

(73) Assignee: Omnitracs, LLC, Westlake, TX (US)

( * ) Notice: Subject to any disclaimer, the term of this patent is extended or adjusted under 35 U.S.C. 154(b) by 219 days.

(21) Appl. No.: 17/473,733

(22) Filed: Sep. 13, 2021

(65) Prior Publication Data
US 2023/0084964 A1    Mar. 16, 2023

(51) Int. Cl.
*G01C 21/34* (2006.01)
*B60W 40/09* (2012.01)
(Continued)

(52) U.S. Cl.
CPC .......... *G01C 21/343* (2013.01); *B60W 40/09* (2013.01); *G01C 21/3453* (2013.01);
(Continued)

(58) Field of Classification Search
CPC . G01C 21/343; G01C 21/3453; B60W 40/09; B60W 2420/42; B60W 2540/229; G06Q 10/06311; G06Q 10/06398
See application file for complete search history.

(56) References Cited

U.S. PATENT DOCUMENTS 6,108,591 A  *  8/2000  Segal ..................... G08G 1/127
                                                 701/1
7,219,067 B1     5/2007  Mcmullen
(Continued)

FOREIGN PATENT DOCUMENTS

AU       2017200943         8/2017
CN     117104256 A         11/2023
(Continued)

OTHER PUBLICATIONS

PCT International Search Report and Written Opinion for PCT Application No. PCT/US2020/027035, dated Jun. 19, 2020 (14 pages).
(Continued)

*Primary Examiner* — Kito R Robinson
*Assistant Examiner* — Roy Rhee
(74) *Attorney, Agent, or Firm* — Esplin & Associates, PC

(57) ABSTRACT

Systems and methods for determining and using fleet-specific vehicle operator performance for a set of vehicle operators are disclosed. A fleet of vehicles may be operated by a set of vehicle operators. Exemplary implementations may obtain trip information or service information that include values for driver performance metrics pertaining to individual vehicle operators; determine the fleet-specific vehicle operator performance by aggregating information included in the obtained trip and/or service information; determine particular metric values for a particular vehicle operator; compare the determined fleet-specific vehicle operator performance with the determined particular metric values; based on the comparison, generate and/or provide one or more notifications to at least one of the particular vehicle operator, a stakeholder of the fleet of vehicles, and a remote computing server. In some implementations, a system may recommend taking a particular action, including (Continued)

but not limited to scheduling a break for the particular vehicle operator.

18 Claims, 4 Drawing Sheets

(51) Int. Cl.
*G06Q 10/0631* (2023.01)
*G06Q 10/0639* (2023.01)

(52) U.S. Cl.
CPC . *G06Q 10/06311* (2013.01); *G06Q 10/06398* (2013.01); *B60W 2420/403* (2013.01); *B60W 2540/229* (2020.02)

(56) References Cited

U.S. PATENT DOCUMENTS

| | | |
|---|---|---|
| 7,590,616 B2 | 9/2009 | Guan |
| 7,930,232 B2 | 4/2011 | Cooper |
| 8,326,746 B1 | 12/2012 | Crawford |
| 8,781,669 B1 | 7/2014 | Teller |
| 8,915,738 B2 | 12/2014 | Mannino |
| 8,989,959 B2 | 3/2015 | Plante |
| 9,226,004 B1 | 12/2015 | Plante |
| 9,298,809 B2 | 3/2016 | Kemp |
| 9,625,266 B1 | 4/2017 | Chintakindi |
| 9,739,622 B2 | 8/2017 | Yamashita |
| 9,852,475 B1 | 12/2017 | Konrardy |
| 9,898,759 B2 | 2/2018 | Khoury |
| 10,083,493 B1 | 9/2018 | Davis |
| 10,129,221 B1 | 11/2018 | Mcclendon |
| 10,203,212 B2 | 2/2019 | Mazzella |
| 10,204,528 B2 | 2/2019 | Truong |
| 10,332,390 B1 | 6/2019 | Brinkmann |
| 10,371,542 B2 | 8/2019 | O'Herlihy |
| 10,402,771 B1 | 9/2019 | De |
| 10,445,950 B1 | 10/2019 | De |
| 10,580,296 B2 | 3/2020 | Pedersen |
| 10,580,306 B1 | 3/2020 | Harris |
| 10,586,024 B1 | 3/2020 | Patton |
| 10,591,311 B2 | 3/2020 | Augst |
| 10,664,922 B1 | 5/2020 | Madigan |
| 10,672,198 B2 | 6/2020 | Brinig |
| 10,679,497 B1 | 6/2020 | Konrardy |
| 10,789,838 B2 | 9/2020 | Amacker |
| 10,795,380 B1 | 10/2020 | Patton |
| 10,830,605 B1 | 11/2020 | Chintakindi |
| 11,124,186 B1 | 9/2021 | Konrardy |
| 11,175,660 B1 | 11/2021 | Fields |
| 11,567,988 B2 | 1/2023 | Rönnäng |
| 11,609,579 B2 | 3/2023 | Forney |
| 2002/0111172 A1 | 8/2002 | Dewolf |
| 2003/0154009 A1 | 8/2003 | Basir |
| 2004/0236596 A1 | 11/2004 | Chowdhary |
| 2005/0097028 A1 | 5/2005 | Watanabe |
| 2007/0001831 A1 | 1/2007 | Raz |
| 2007/0239322 A1 | 10/2007 | McQuade |
| 2008/0004638 A1 | 1/2008 | Baker |
| 2008/0046383 A1 | 2/2008 | Hirtenstein |
| 2009/0198422 A1 | 8/2009 | Vik |
| 2009/0234552 A1 | 9/2009 | Takeda |
| 2010/0063850 A1 | 3/2010 | Daniel |
| 2010/0157061 A1 | 6/2010 | Katsman |
| 2011/0173015 A1 | 7/2011 | Chapman |
| 2011/0178702 A1 | 7/2011 | Lassesson |
| 2012/0174111 A1 | 7/2012 | Pala |
| 2012/0191343 A1 | 7/2012 | Haleem |
| 2012/0209579 A1* | 8/2012 | Fansler ............... G06Q 10/04 703/8 |
| 2012/0227822 A1 | 9/2012 | Humphreys |
| 2012/0256770 A1* | 10/2012 | Mitchell ............. G08G 1/127 340/989 |
| 2013/0110392 A1* | 5/2013 | Kosseifi ........... G01C 21/3492 701/410 |
| 2013/0189649 A1 | 7/2013 | Mannino |
| 2013/0198031 A1 | 8/2013 | Mitchell |
| 2013/0289846 A1 | 10/2013 | Mitchell |
| 2014/0073362 A1 | 3/2014 | Kawata |
| 2014/0180730 A1 | 6/2014 | Cordova |
| 2014/0275834 A1 | 9/2014 | Bennett |
| 2014/0372226 A1 | 12/2014 | Pavley |
| 2015/0064659 A1 | 3/2015 | Dubens |
| 2015/0175067 A1 | 6/2015 | Keaveny |
| 2015/0193994 A1 | 7/2015 | Mcquade |
| 2015/0223024 A1 | 8/2015 | Abuodeh |
| 2015/0266455 A1 | 9/2015 | Wilson |
| 2015/0278855 A1 | 10/2015 | Khoury |
| 2015/0356635 A1 | 12/2015 | Thurston |
| 2016/0082953 A1 | 3/2016 | Teller |
| 2016/0117872 A1 | 4/2016 | Plante |
| 2016/0203560 A1 | 7/2016 | Parameshwaran |
| 2016/0244067 A1 | 8/2016 | Hunt |
| 2016/0358496 A1 | 12/2016 | Mcquade |
| 2017/0010109 A1 | 1/2017 | Hayon |
| 2017/0032324 A1 | 2/2017 | Grover |
| 2017/0057411 A1 | 3/2017 | Heath |
| 2017/0061222 A1 | 3/2017 | Hoye |
| 2017/0061826 A1 | 3/2017 | Jain |
| 2017/0072850 A1 | 3/2017 | Curtis |
| 2017/0123421 A1 | 5/2017 | Kentley |
| 2017/0132117 A1 | 5/2017 | Stefan |
| 2017/0219356 A1 | 8/2017 | Murayama |
| 2017/0221149 A1 | 8/2017 | Hsu-Hoffman |
| 2017/0255966 A1 | 9/2017 | Khoury |
| 2017/0263120 A1 | 9/2017 | Durie, Jr. |
| 2017/0286886 A1 | 10/2017 | Halepatali |
| 2017/0305434 A1 | 10/2017 | Ratnasingam |
| 2017/0323244 A1 | 11/2017 | Rani |
| 2017/0323249 A1 | 11/2017 | Khasis |
| 2018/0059687 A1 | 3/2018 | Hayes |
| 2018/0075309 A1 | 3/2018 | Sathyanarayana |
| 2018/0086347 A1 | 3/2018 | Shaikh |
| 2018/0089605 A1 | 3/2018 | Poornachandran |
| 2018/0093672 A1* | 4/2018 | Terwilliger ............ G08B 21/06 |
| 2018/0106633 A1 | 4/2018 | Chintakindi |
| 2018/0130095 A1 | 5/2018 | Khoury |
| 2018/0136651 A1 | 5/2018 | Levinson |
| 2018/0157979 A1 | 6/2018 | Dehaghani |
| 2018/0253769 A1 | 9/2018 | Ye |
| 2018/0276351 A1 | 9/2018 | Patton |
| 2018/0276485 A1 | 9/2018 | Heck |
| 2018/0290124 A1 | 10/2018 | Phoenix |
| 2018/0336423 A1 | 11/2018 | Ban |
| 2018/0339712 A1 | 11/2018 | Kislovskiy |
| 2018/0340790 A1 | 11/2018 | Kislovskiy |
| 2018/0341276 A1 | 11/2018 | Kislovskiy |
| 2018/0341881 A1 | 11/2018 | Kislovskiy |
| 2018/0341887 A1 | 11/2018 | Kislovskiy |
| 2018/0341888 A1 | 11/2018 | Kislovskiy |
| 2018/0341895 A1 | 11/2018 | Kislovskiy |
| 2018/0342033 A1 | 11/2018 | Kislovskiy |
| 2018/0342034 A1 | 11/2018 | Kislovskiy |
| 2018/0342113 A1 | 11/2018 | Kislovskiy |
| 2018/0350144 A1 | 12/2018 | Rathod |
| 2018/0356814 A1 | 12/2018 | Brooks |
| 2019/0005812 A1 | 1/2019 | Matus |
| 2019/0022347 A1 | 1/2019 | Wan |
| 2019/0102840 A1 | 4/2019 | Perl |
| 2019/0146508 A1 | 5/2019 | Dean |
| 2019/0212453 A1 | 7/2019 | Natroshvili |
| 2019/0223773 A1* | 7/2019 | Galm ................... G16H 50/20 |
| 2019/0286793 A1 | 9/2019 | Patton |
| 2020/0101969 A1 | 4/2020 | Natroshvili |
| 2020/0156654 A1 | 5/2020 | Boss |
| 2020/0198644 A1 | 6/2020 | Hutchings |
| 2020/0241564 A1 | 7/2020 | Goldman |
| 2020/0346641 A1 | 11/2020 | Woon |
| 2020/0346643 A1 | 11/2020 | Woon |
| 2020/0348675 A1 | 11/2020 | Brookins |
| 2020/0348692 A1 | 11/2020 | Ghanbari |
| 2020/0348693 A1 | 11/2020 | Forney |
| 2020/0357175 A1 | 11/2020 | Silverstein |
| 2021/0039653 A1 | 2/2021 | Sato |

(56) References Cited

U.S. PATENT DOCUMENTS

| | | |
|---|---|---|
| 2021/0049714 A1 | 2/2021 | Shaaban |
| 2021/0056775 A1 | 2/2021 | Freitas |
| 2021/0089780 A1 | 3/2021 | Chang |
| 2021/0164792 A1 | 6/2021 | Pal |
| 2021/0279603 A1 | 9/2021 | Teran Matus |
| 2021/0312525 A1 | 10/2021 | Goenka |
| 2021/0312725 A1 | 10/2021 | Milton |
| 2021/0331668 A1 | 10/2021 | Udipi |
| 2021/0383623 A1 | 12/2021 | Tokman |
| 2022/0194429 A1 | 6/2022 | Cho |
| 2022/0205798 A1 | 6/2022 | Rivella |
| 2023/0076648 A1 | 3/2023 | Cardona |
| 2023/0078143 A1 | 3/2023 | Ghanbari |
| 2023/0176587 A1 | 6/2023 | Forney |
| 2023/0339502 A1 | 10/2023 | Chi-Johnston |
| 2023/0339519 A1 | 10/2023 | Chi-Johnston |
| 2023/0408271 A1 | 12/2023 | Rusciano |
| 2024/0036580 A1 | 2/2024 | Brookins |

FOREIGN PATENT DOCUMENTS

| | | |
|---|---|---|
| KR | 20140147233 A | 12/2014 |
| KR | 101542982 B1 | 8/2015 |
| WO | 2013138798 | 9/2013 |
| WO | 2015036471 | 3/2015 |
| WO | 2017192726 | 11/2017 |
| WO | 2019232022 A1 | 12/2019 |
| WO | 2023038993 | 3/2023 |
| WO | 2023038996 | 3/2023 |

OTHER PUBLICATIONS

Machine translation of KR 101542982 B1 (Year: 2015).
CN-117104256-A English translation (Year: 2024).
Machine translation of KR-20140147233-A (Year: 2014) 16 pages.

\* cited by examiner

SYSTEMS AND METHODS FOR DETERMINING AND USING FLEET-SPECIFIC DRIVER PERFORMANCE

FIELD OF THE DISCLOSURE

The present disclosure relates to systems and methods for determining and using fleet-specific vehicle operator performance for a set of vehicle operators.

BACKGROUND

Monitoring vehicle operations is known, in particular for the occurrence of vehicle events such as speeding or collisions. Quantifying a driver's performance based on the number of specific occurrences of certain vehicle events, such as speeding, is known.

SUMMARY

One aspect of the present disclosure relates to a system configured for determining and using fleet-specific vehicle operator performance for a set of vehicle operators. A fleet of vehicles may be operated by a set of vehicle operators. The system may be configured to obtain trip information or service information that include values for driver performance metrics pertaining to individual vehicle operators. The system may be configured to determine the fleet-specific vehicle operator performance by aggregating information included in the obtained trip and/or service information. The system may be configured to determine particular metric values for a particular vehicle operator. The system may be configured to compare the determined fleet-specific vehicle operator performance with the determined particular metric values. Based on the comparison, the system may be configured to generate and/or provide one or more notifications to at least one of the particular vehicle operator, a stakeholder of the fleet of vehicles, and a remote computing server. In some implementations, the system may be configured to recommend taking a particular action, including but not limited to scheduling a break for the particular vehicle operator.

Another aspect of the present disclosure relates to a method for determining and using fleet-specific vehicle operator performance for a set of vehicle operators. A fleet of vehicles may be operated by a set of vehicle operators. The method may include obtaining trip information or service information that include values for driver performance metrics pertaining to individual vehicle operators. The method may include determining the fleet-specific vehicle operator performance by aggregating information included in the obtained trip and/or service information. The method may include determining particular metric values for a particular vehicle operator. The method may include comparing the determined fleet-specific vehicle operator performance with the determined particular metric values. Based on the comparison, the method may include generating and/or providing one or more notifications to at least one of the particular vehicle operator, a stakeholder of the fleet of vehicles, and a remote computing server. In some implementations, the method may include recommending taking a particular action, including but not limited to scheduling a break for the particular vehicle operator.

As used herein, any association (or relation, or reflection, or indication, or correspondency) involving servers, processors, client computing platforms, vehicles, vehicle operators, trips, work shifts, trip information, service information, operator identifiers, vehicle identifiers, performance information, sensors, locations, directions, conditions, operations, determinations, detections, durations, limits, thresholds, metric values, metrics, recommendations, notifications, vehicle events, and/or another entity or object that interacts with any part of the system and/or plays a part in the operation of the system, may be a one-to-one association, a one-to-many association, a many-to-one association, and/or a many-to-many association or "N"-to-"M" association (note that "N" and "M" may be different numbers greater than 1).

As used herein, the term "obtain" (and derivatives thereof) may include active and/or passive retrieval, determination, derivation, transfer, upload, download, submission, and/or exchange of information, and/or any combination thereof. As used herein, the term "effectuate" (and derivatives thereof) may include active and/or passive causation of any effect, both local and remote. As used herein, the term "determine" (and derivatives thereof) may include measure, calculate, compute, estimate, approximate, generate, and/or otherwise derive, and/or any combination thereof.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
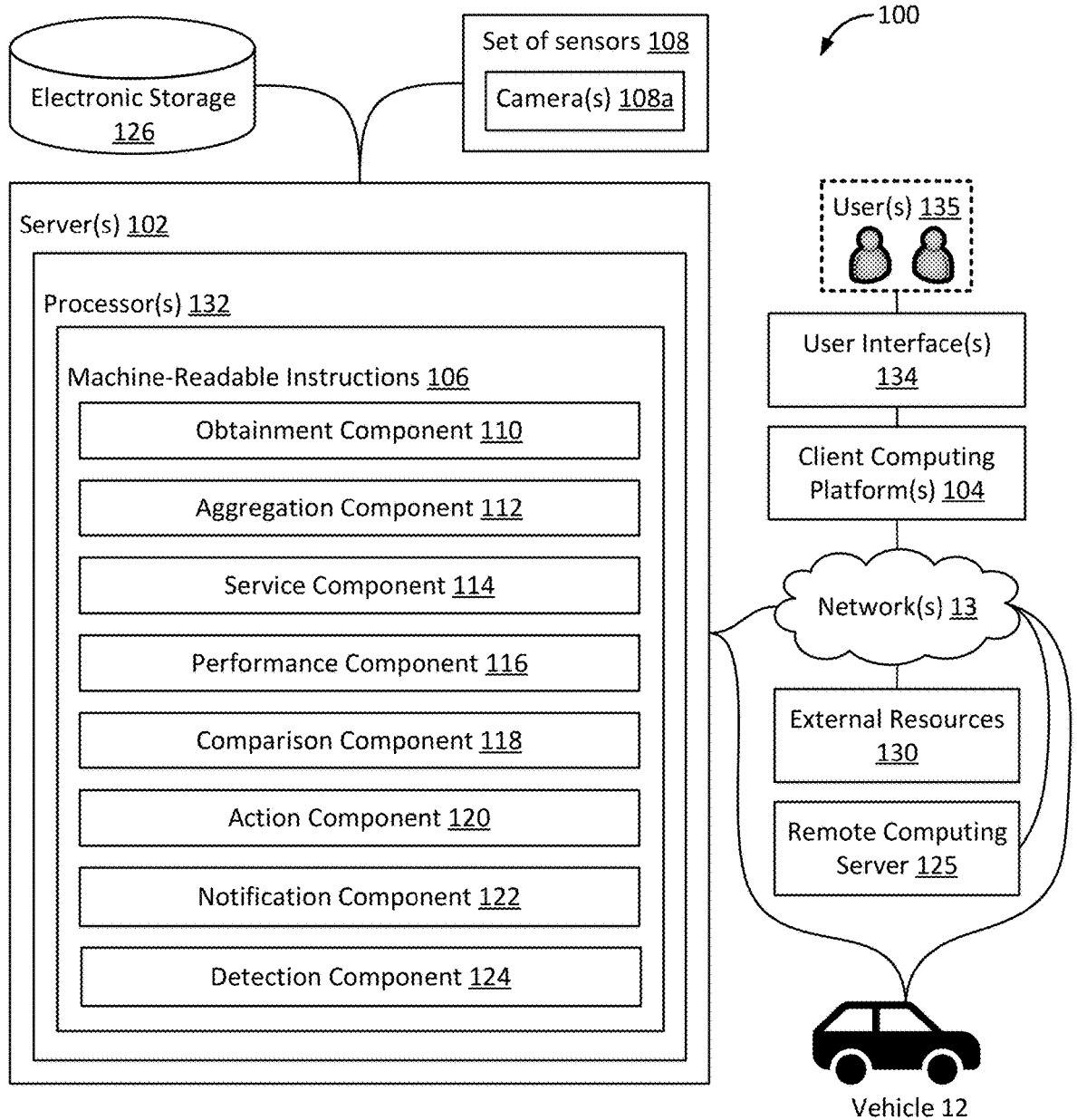
FIG. 1 illustrates a system configured for determining and using fleet-specific vehicle operator performance for a set of vehicle operators, in accordance with one or more implementations.

FIG. 1 illustrates a system 100 configured for determining and using fleet-specific vehicle operator performance for a set of vehicle operators, in accordance with one or more implementations. The fleet-specific vehicle operator performance is specific to a fleet of vehicles. The fleet of vehicles may include a vehicle 12 and/or other vehicles. For example, the fleet may include a first vehicle, a second vehicle, a third vehicle, and so forth. Individual vehicles may be associated with individual vehicle operators. For example, vehicle 12 may be associated with a first vehicle operator, the second vehicle may be associated with a second vehicle operator, the third vehicle may be associated with a third vehicle operator, and so forth. The fleet of vehicles may be operated by a set of vehicle operators.

By virtue of the systems and methods described in this disclosure, users may determine the common or average relationship between the duration of a trip or work shift and the performance for the vehicle operators of a particular fleet of vehicles. In many cases, this performance slowly degrades as the duration extends to, say, 8 hours. In other words, this performance may be higher, typically, after 1 hour of a particular trip, and lower after, say, 7 hours of this same trip. Additionally, by virtue of the systems and methods described in this disclosure, users may use this determined relationship in comparison to the particular individual driver performance for a particular individual driver during a particular individual trip or work shift.

In some implementations, system 100 may include one or more of server(s) 102, electronic storage 126, processor(s) 132, set of sensors 108, user interface(s) 134, network(s) 13, client computing platform(s) 104, external resources 130, a remote computing server 125, and/or other components. System 100 and/or components thereof may be carried and/or otherwise supported by one or more vehicles (e.g., a first vehicle, a second vehicle, a third vehicle, and so forth), including but not limited to a vehicle 12. Operation of system 100 may be described in the context of a particular vehicle, e.g., vehicle 12, but this is not intended to be limiting. System 100 may operate as described for a fleet of multiple vehicles. In some implementations, individual vehicles (e.g., vehicle 12) may carry and/or otherwise support system 100 and/or components thereof. Server(s) 102 may be configured to communicate with one or more client computing platforms 104 according to a client/server architecture and/or other architectures. Client computing platform(s) 104 may be configured to communicate with other client computing platforms via server(s) 102 and/or according to a peer-to-peer architecture and/or other architectures. User(s) 135 (e.g., a first administrative user, a second administrative user, and so forth) may access system 100 via user interface(s) 134 associated with and/or included in client computing platform(s) 104.

Individual vehicles may include a set of resources for information gathering, data processing, and/or electronic storage, including but not limited to persistent storage. Individual vehicles may include sensors (e.g., set of sensors 108 configured to generate and/or otherwise gather data, such as output signals). In some implementations, individual vehicles may be configured to detect vehicle events, e.g., based on output signals generated by set of sensors 108. As used herein, the term "vehicle event" may include occurrences of events involving one or more vehicles. As such, detection of vehicle events may include gathering information by monitoring the operation of one or more vehicles, including but not limited to information related to current or past vehicle speeds, current or current location, and/or other information pertinent to detecting of vehicle events. In some implementations, individual vehicles may be configured to determine operator attentiveness, e.g., based on output signals generated by set of sensors 108 (e.g., by one or more cameras 108*a*). Determination of attentiveness may include gathering information by monitoring the vehicle operators of one or more vehicles (by way of non-limiting example, direction of gaze, blinking, rate of blinking, change in rate of blinking, duration of closing eyes, change in average duration of closing eyes, tilting of head, angle of tilting of head, frequency of tilting of head, change in frequency of tilting of head, shaking of head, frequency of shaking of head, change in frequency of shaking of head, and/or other bodily movements that may be related to attentiveness, distractedness, fatigue, and/or drowsiness, as well as derivatives thereof), as well as monitoring vehicle operations.

In some implementations, operation of vehicle 12 may be actively and primarily controlled by a vehicle operator (i.e., a human operator). In such a case, a non-human vehicle operator may take over (or be requested to take over) control of the vehicle in certain circumstances. In some implementations, operation of vehicle 12 may be actively and primarily controlled by an autonomous driving algorithm (also referred to as an algorithmic vehicle operator, or a non-human vehicle operator). In such a case, a human vehicle operator may take over (or be requested to take over) control of the autonomous driving algorithm, e.g., responsive to extreme and/or unconventional driving scenarios, or responsive to a failure or error-condition of the autonomous driving algorithm. In some implementations, a human vehicle operator and an autonomous driving algorithm may form a team that controls operations of vehicle 12 together.

Set of sensors 108 may be configured to generate output signals conveying information related to (operation of) vehicle 12, a location of vehicle 12, a vehicle operator of vehicle 12, and/or a context of vehicle 12 (e.g., related to the surroundings of vehicle 12 and/or related to other vehicles near vehicle 12). In some implementations, set of sensors 108 may be carried by vehicle 12. In some implementations, one or more sensors in set of sensors 108 may be external to vehicle 12, such as roadside sensors, sensors embedded in the surface of a road, sensors carried by other vehicles, and/or other sensors. Although set of sensors 108 is depicted in FIG. 1 as a single element, this is not intended to be limiting. In some implementations, set of sensors 108 may be configured to generate output signals continuously, in an on-going manner, and/or at regular or irregular intervals during operation of vehicle 12. In some implementations, set of sensors 108 may include one or more cameras 108*a*.

Information related to the operation of vehicle 12 may include feedback information from one or more of the mechanical systems (not shown in FIG. 1) of vehicle 12, and/or other information. The mechanical systems of vehicle 12 may include, for example, the engine, the drive train, the lighting systems (e.g., headlights, brake lights), the braking system, the transmission, fuel delivery systems, and/or other mechanical systems. The mechanical systems of vehicle 12 may include one or more mechanical sensors, electronic sensors, and/or other sensors that generate the output signals (e.g., seat belt sensors, tire pressure sensors, etc.). In some implementations, at least one sensor included in set of sensors 108 may be a vehicle system sensor included in an Engine Control Module (ECM) system of vehicle 12.

In some implementations, set of sensors 108 may generate output signals conveying information related to a vehicle operator of vehicle 12, such as visual information, motion-related information, position-related information, biometric information, medical information, and/or other information. In some implementations, set of sensors 108 may include one or more sensors configured to generate output signals that convey information related to biological activity of the vehicle operator. In some implementations, one or more sensors may be wearable by the vehicle operator. In some implementations, one or more sensors may be placed in physical proximity to the vehicle operator to facilitate monitoring the biological activity of the vehicle operator. The information related to the biological activity of a particular vehicle operator may include heart rate, respiration rate, blood pressure, blinking, head nodding, head movement, verbal expressions, responses to conditions in the physical environment in and/or around vehicle 12, and/or other characteristics of or information about the particular vehicle operator.

In some implementations, set of sensors 108 may generate output signals conveying information related to the context of vehicle 12, such as information related to the environment in and/or around vehicle 12. The vehicle environment may include spaces in and around an interior and an exterior of vehicle 12. The information related to the context of vehicle 12 may include information related to movement of vehicle 12, an orientation of vehicle 12, a geographic position of vehicle 12, a spatial position of vehicle 12 relative to other objects, a tilt angle of vehicle 12, an inclination/declination angle of vehicle 12, and/or other information. For example, set of sensors 108 may be configured to generate output signals conveying information related to the distance vehicle 12 is keeping from one or more vehicles in front of vehicle 12. For example, set of sensors 108 may be configured to generate output signals conveying information related to how well vehicle 12 is staying within a particular lane.

In some implementations, the output signals conveying the information related to the context of vehicle 12 may be generated via non-standard aftermarket sensors installed in vehicle 12. Set of sensors 108 may include, for example, one or more of an image sensor, a camera, a video camera, a microphone, an accelerometer, a gyroscope, a geolocation sensor (e.g., a Global Positioning System or GPS device), a radar detector, a magnetometer, lidar (e.g., for measuring distance of a leading vehicle), an altimeter (e.g. a sonic altimeter, a radar altimeter, and/or other types of altimeters), a barometer, a magnetometer, a pressure sensor (e.g. a static pressure sensor, a dynamic pressure sensor, a pitot sensor, etc.), a thermometer, an inertial measurement sensor, a tilt sensor, a motion sensor, a vibration sensor, an ultrasonic sensor, an infrared sensor, a light sensor, a depth sensor, an air speed sensor, a ground speed sensor, an altitude sensor, medical sensors (including but not limited to blood pressure sensor, pulse oximeter, heart rate sensor, etc.), degree-of-freedom sensors (e.g. 6-DOF and/or 9-DOF sensors), a compass, and/or other sensors. As used herein, the term "motion sensor" may include one or more sensors configured to generate output conveying information related to position, location, distance, motion, movement, acceleration, and/or other motion-based parameters. Output signals generated by individual sensors (and/or information based thereon) may be stored and/or transferred in electronic files. In some implementations, output signals may be transferred as one or more streams of data.

Regarding one or more cameras 108a, as used herein, the terms "camera" and/or "image sensor" may include any device that captures image information, including but not limited to a single lens-based camera, a camera array, a solid-state camera, a mechanical camera, a digital camera, an image sensor, a depth sensor, a remote sensor, a lidar, an infrared sensor, a (monochrome) complementary metal-oxide-semiconductor (CMOS) sensor, an active pixel sensor, and/or other sensors. Individual sensors may be configured to capture information, including but not limited to visual information, video information, audio information, geolocation information, orientation and/or motion information, depth information, distance information, and/or other information. Information captured by one or more sensors may be marked, timestamped, annotated, and/or otherwise processed such that information captured by other sensors can be synchronized, aligned, annotated, and/or otherwise associated therewith. For example, video information captured by an image sensor may be synchronized with information captured by an accelerometer or other sensor. In some implementations, set of sensors 108 may include multiple cameras 108a positioned around the vehicle and synchronized together to provide a 360-degree view of the inside of a vehicle and/or a 360-degree view of the outside of a vehicle. In some implementations, one or more cameras 108a may be positioned to capture visual information and/or image information regarding a particular vehicle operator. In some implementations, an image sensor may be integrated with electronic storage such that captured information may be (processed and) stored in the integrated embedded storage. In some implementations, a sensor may be configured to transfer captured information to remote electronic storage media, e.g., through "the cloud."

Server(s) 102 may be configured by machine-readable instructions 106. Machine-readable instructions 106 may include one or more instruction components. The instruction components may include computer program components. The instruction components may include one or more of an obtainment component 110, an aggregation component 112, a service component 114, a performance component 116, a comparison component 118, an action component 120, a notification component 122, a detection component 124, and/or other instruction components.

Obtainment component 110 may be configured to obtain trip information for a set of trips and/or service information for a set of work shifts, by a set of vehicle operators. As used herein, a "trip" may refer to an individual vehicle operated by an individual vehicle operator or a team of operators from one location to another location, in particular a destination. Typically, a trip has been scheduled between a particular point of origin and a destination. As used herein, an individual trip may end if the one or more vehicle operators have a scheduled break or rest period for at least a predetermined duration or breaktime. For example, a scheduled break (e.g., from driving) may be 6 hours, 7 hours, 8 hours, 9 hours, 10 hours, 11 hours, 12 hours, 13 hours, 14 hours, 15 hours, 16 hours, and/or another duration. Upon continuing a journey after such a scheduled break, as used herein, system 100 may consider that a new individual trip, and not part of the previous individual trip. For example, a long-haul trucker may drive hundreds of miles with few stops, and not rest until he or she has driven, say, eight hours. This would be a single trip. After a scheduled rest (say, a 9-hour break), the same journey may continue, but would be considered a new individual trip.

As used herein, a "work shift" may refer to an individual vehicle operated by an individual vehicle operator or a team of operators for a particular duration, in particular a scheduled duration. Typically, an individual work shift has been scheduled to end if the one or more vehicle operators have a scheduled break or rest period for at least a predetermined duration or breaktime. For example, a scheduled break (e.g., from an individual work shift) may be 6 hours, 7 hours, 8 hours, 9 hours, 10 hours, 11 hours, 12 hours, 13 hours, 14 hours, 15 hours, 16 hours, and/or another duration. Upon continuing work after such a scheduled break, as used herein, system 100 may consider that a new individual work shift, and not part of the previous individual work shift. By way of non-limiting example, a driver making many deliveries in a particular area may stop and park many times throughout an individual work shift.

In some implementations, trip information for an individual trip may include one or more of an operator identifier that identifies an individual vehicle operator, a vehicle identifier that identifies an individual vehicle, an (actual) individual trip duration of the individual trip, performance information regarding the individual vehicle operator, and/or other information. In some implementations, performance information may represent one or more (numerical) metric values for one or more driver performance metrics pertaining to a particular vehicle operator. In some implementations, values for a driver performance metric may be determined at any time during a trip or work shift. Alternatively, and/or simultaneously, a particular value for a particular driver performance metric may pertain to the entirety of a trip or work shift (or to the entirety up to a current moment in time).

For example, one or more of the driver performance metrics may be related to occurrences of particular vehicle events during a trip or work shift. By way of non-limiting example, such vehicle events may include speeding, hard braking, hard braking where the vehicle in front is not showing its brake lights on, near collisions, swerving, swerving-to-stay-within-a-lane, failing to maintain proper/predetermined following distance, and/or other vehicle events. For this example, more occurrences of such vehicle events would correlate to a lower performance of the particular vehicle operator. For example, a numerical value of a particular driver performance metric may be expressed as a percentage between 0% and 100%, where 100% indicates flawless performance (e.g., having no occurrences of the types of vehicle events described in this paragraph), and 0% indicates a terribly flawed performance. In some implementations, values for this particular driver performance metric may be determined at intervals and/or intermittently through a particular trip or work shift (e.g., more than once). In some implementations, values for this particular driver performance metric may be determined continuously through a particular trip or work shift (e.g., every minute, every 5 minutes, every 10 minutes, every 15 minutes, every hours, etc.).

For example, one or more of the driver performance metrics may be related to determinations of operator attentiveness (and/or conversely, distractedness, drowsiness, fatigue, etc.) during a trip or work shift. By way of non-limiting example, such determinations may be based on image information captured of a particular vehicle operator during a trip or work shift. For example, such determinations may include direction of gaze, blinking, rate of blinking, change in rate of blinking, duration of closing eyes, change in average duration of closing eyes, tilting of head, angle of tilting of head, frequency of tilting of head, change in frequency of tilting of head, shaking of head, frequency of shaking of head, change in frequency of shaking of head, and/or other operator actions or bodily movements that may be related to attentiveness, distractedness, fatigue, and/or drowsiness, as well as derivatives thereof. For this example, more occurrences of such operator actions or bodily movements would correlate to a lower performance of the particular vehicle operator. For example, a numerical value of a particular driver performance metric may be expressed as a percentage between 0% and 100%, where 100% indicates flawless performance (e.g., having perfect attentiveness), and 0% indicates a terribly flawed performance. In some implementations, values for this particular driver performance metric may be determined at intervals and/or intermittently through a particular trip or work shift (e.g., more than once). In some implementations, values for this particular driver performance metric may be determined continuously through a particular trip or work shift (e.g., every minute, every 5 minutes, every 10 minutes, every 15 minutes, every hours, etc.).

In some implementations, a particular driver performance metric for an particular individual trip or work shift may be based on aggregating and/or otherwise combining metrics values of (i) one or more driver performance metrics related to occurrences of particular vehicle events during the particular individual trip or work shift (assume for example this first value is expressed as 80%), and (ii) one or more driver performance metrics related to determinations of operator attentiveness during the particular individual trip or work shift (assume for example this second value is expressed as 60%). For example, assume the first value is 80% and the second value is 60% for the same trip (or at a particular moment during this trip). For example, assuming both types of driver performance metric are weighing equally, the combined metric value for this particular individual trip or work shift (or this particular moment during this trip) may be determined arithmetically to be 70%. Other mathematical ways to combine different values are considered within the scope of this disclosure.

Figure 4A:
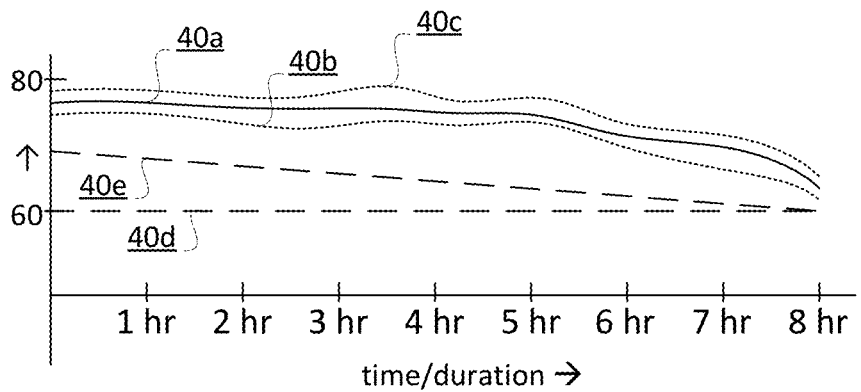
FIGS. 4A-4B-4C illustrate exemplary diagrams pertaining to fleet-specific vehicle operator performance as may be used by a system configured for determining and using fleet-specific vehicle operator performance for a set of vehicle operators, in accordance with one or more implementations.

Aggregation component 112 may be configured to determine a fleet-specific vehicle operator performance for a particular fleet. In some implementations, determinations by aggregation component 112 may be based on trip information and/or service information obtained, e.g., by obtainment component 110. In some implementations, fleet-specific vehicle operator performance may vary as a function of either trip duration or work shift duration. In some implementations, fleet-specific vehicle operator performance may be dependent on either trip duration or work shift duration (in other words, it may be duration-dependent). Determinations by aggregation component 112 may be based on averaging values (of performance information) for individual trips, specifically for similar or the same driver performance metrics. For example, if half of the vehicle operators have a constant performance percentage of 80% throughout all 8 hours of trip duration, and the other half of the vehicle operators have a constant performance percentage of 60% throughout all 8 hours of trip duration, the average value would be a constant performance percentage of 70% throughout all 8 hours of trip duration. As another example, if half of the vehicle operators have a performance percentage that degrades gradually from a start of 80% to an end, at 8 hours of trip duration, of 70%, and the other half of the vehicle operators have a performance percentage that degrades gradually from a start of 60% to an end, at 8 hours of trip duration, of 50%, the average value would be a performance percentage that gradually degrades from 70% at the start to 60% at the end (with, for example, being 65% at the 4-hour mark of trip duration). In some implementations, the fleet-specific vehicle operator performance at a particular duration may range between a lower level and a higher level. By way of non-limiting example, FIG. 4A illustrates an exemplary diagram 400 pertaining to fleet-specific vehicle operator performance as may be determined and/or used by system 100. For example, an average performance function 40*a* (as may have been determined by aggregation component 112) may represent the average performance value, expressed as a percentage for particular obtained trip information, illustration a gradual deterioration and/or degradation as the duration extends from 0 hours to 8 hours. As depicted, the average performance percentage starts at just over 75% (at the start of a trip, or 0 hour), and gradually decreases to just under 65% (at the 8 hour mark of trip duration). In some implementations, the averaged and/or otherwise aggregated fleet-specific vehicle operator performance at a particular duration may range between a lower level performance function 40b and a higher level performance function 40c. For example, these levels may correspond to a standard deviation from average, or to the range within which 80% (or some other percentage) of a particular fleet's drivers operate, or to another mathematical definition of variance. In particular, an individual vehicle operator's performance outside of this range (in particular, below lower level performance function 40b) may be considered noteworthy and/or potentially in need of a subsequent action by system 100.

Referring to FIG. 1, service component 114 may be configured to obtain information regarding scheduled trips and/or scheduled work shifts. For example, service component 114 may obtain information regarding a particular scheduled trip of a particular vehicle operator operating a particular vehicle. The obtained information may include a particular scheduled trip duration. In some implementations, obtained information may include hours-of-service (HOS) information, including but not limited to driver duty status, login/logout information, current and/or cumulative drive time, HOS violation event information, current and/or past loads, driver certification record information, engine status information, information regarding the most recent rest or break, and/or other HOS information. In some implementations, obtained information may include current and/or planned route information, driver directions, trip status, driver task status, delivery status, appointment time, arrival and/or departure status and/or time, information regarding planned and unplanned stops as well as duration of stops, and/or other information regarding route or load.

Performance component 116 may be configured to determine metric values of driver performance metrics for one or more trips and/or work shifts (of one or more vehicle operators). For example, performance component 116 may determine a current value of a performance metric for a particular vehicle operator during a particular trip. In some implementations, determinations by performance component 116 may be made in real-time or near-real-time (this may be referred to as "current" value or "current" performance). In some implementations, determinations by performance component 116 may be made continuously, at intervals, and/or intermittently. In some implementations, determinations by performance component 116 may be based on occurrences of particular vehicle events, as described elsewhere. Alternatively, and/or simultaneously, determinations by performance component 116 may be based on determinations of operator attentiveness, as described elsewhere. In some implementations, determinations by performance component 116 may be based on combining different types of driver performance metrics.

Comparison component 118 may be configured to compare different performance values, in particular a first performance value (e.g., determined by performance component 116) with a second performance value (e.g., determined by aggregation component 112). For example, comparison component 118 may compare a current performance (of a particular driver on a particular trip) with a particular fleet-specific vehicle operator performance (e.g., a particular performance function such as, by way of non-limiting example, lower level performance function 40b of FIG. 4A). Comparisons may take the actual (current) duration of a particular trip into consideration. Comparisons may take the scheduled trip duration of a particular trip into consideration. For example, the first performance value at the 2-hour mark may be 60%, whereas the second performance value at the same time may be 80%. Accordingly, in some cases, system 100 may be configured to recommend taking a particular action, including but not limited to scheduling a break for the particular vehicle operator, based on the (absolute or relative) difference between these two performance values. In other cases, no action may be recommended, for example in light of the scheduled trip duration being 2 hours and 10 minutes.

In some implementations, comparison component 118 may be configured to compare the changes in a first performance value (e.g., since the start of a trip) with the changes in a second performance value. For example, the first performance value may have dropped 20% in the past 3 hours, whereas the second performance value only dropped 10% in the same timeframe. Accordingly, in some cases, system 100 may be configured to recommend taking a particular action, including but not limited to scheduling a break for the particular vehicle operator. A recommendation may also be based on the scheduled trip duration for the particular trip.

In some implementations, comparison component 118 may be configured to compare the rate of change of a first performance value with the rate of change of a second performance value. For example, the first rate of change may be minus 20% per hour, whereas the second rate of change may be minus 5% per hour at a similar moment or duration of a trip. Accordingly, in some cases, system 100 may be configured to recommend taking a particular action, including but not limited to scheduling a break for the particular vehicle operator. In some cases, the particular recommended action may vary based on the remaining duration of the particular trip. For example, a 5-minute break may be sufficient for a remaining trip duration of 30 minutes, whereas a 1-hour break may be better suited for a remaining trip duration of 3 hours.

In some implementations, comparison component 118 may be configured to compare a first performance value with a threshold performance level. In some implementations, the threshold performance level may be a particular performance function determined by performance component 116, such as, by way of non-limiting example, lower level performance function 40b of FIG. 4A. In some implementations, the threshold performance level may be based on a particular performance function determined by performance component 116, such as, by way of non-limiting example, 10% less than lower level performance function 40b of FIG. 4A. In some implementations, the threshold performance level may be a constant performance level, such as a first threshold level 40d of FIG. 4A, which has the same value, here 60%, throughout the duration of exemplary diagram 400. In some implementations, the threshold performance level may be dynamically change, such as a second threshold level 40e of FIG. 4A, which gradually decreases in value, here from 70% to 60%, throughout the duration of exemplary diagram 400.

Figure 4B:
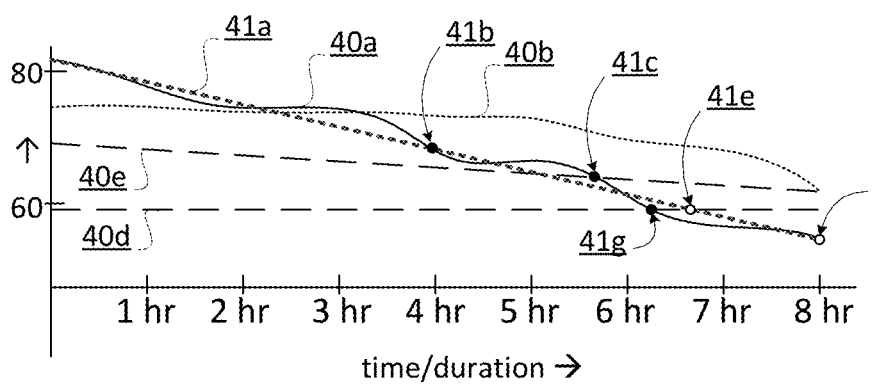

In some implementations, comparison component 118 may be configured to extrapolate a particular set of metric values (e.g., a particular performance value). For example, comparison component 118 may extrapolate a performance value at a given moment in a particular trip (or a particular work shift) through the scheduled trip duration (or work shift duration) for that particular trip or work shift. In some implementations, determinations by action component 120 may be based on these extrapolations. By way of non-limiting example, FIG. 4B illustrates an exemplary diagram 410 pertaining to fleet-specific vehicle operator performance as may be determined and/or used by system 100. Performance function 40a may represent the performance of a particular vehicle operator over an 8-hour trip. Average performance function 40b may be the fleet-specific vehicle operator performance. At the 4-hour mark, a first performance value 41b is about 70%. An extrapolated or expected performance function 41a made at that moment may be used to determine when the performance of the particular vehicle operator would be expected to match first threshold level 40d (here, at a time/duration mark 41e, roughly at 6.5 hours). Additionally, extrapolated or expected performance function 41a may be used to determine what the expected performance of the particular vehicle operator would be at the 8-hour time/duration mark 41f, roughly indicating a 55% performance value. The actual performance function 40a may turn out to match second threshold level 40e at a time/duration mark 41c, at just over 65%, and first threshold level 40d at a time/duration mark 41g, at about 6.25 hours. Assuming the scheduled trip duration is 8 hours, system 100 may recommend a particular action at the 4-hour mark (e.g., take a 30 minute break) in the expectation that performance function 40a would accordingly be improved from what is depicted in exemplary diagram 410, e.g., by remaining above either first threshold level 40d or second threshold level 40e. Alternatively, assuming the scheduled trip duration is 6 hours, system 100 may determine there is no need to recommend or taken any of the actions described in this disclosure.

Figure 4C:
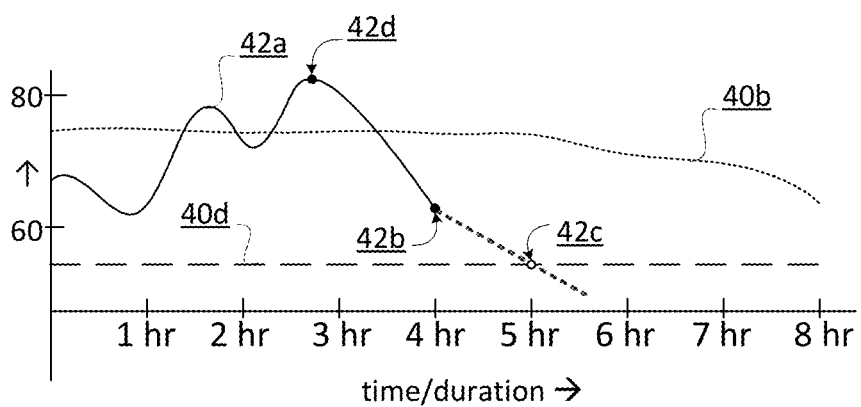

By way of non-limiting example, FIG. 4C illustrates an exemplary diagram 420 pertaining to fleet-specific vehicle operator performance as may be determined and/or used by system 100. Performance function 42a may represent the actual performance of a particular vehicle operator over the first 4 hours of a trip or work shift. At a time/duration mark 42b (here, at 4 hours) system 100 may compare the values in performance function 42a to average fleet-specific vehicle operator performance 40b, first threshold level 40d, and/or other information, to determine whether to recommend and/or take a particular action. In some implementations, an extrapolated or expected performance function made at the 4-hour mark may be used to determine when the performance of the particular vehicle operator would be expected to match first threshold level 40d (here, at a time/duration mark 42c, at a duration of 5 hours). Depending on the scheduled trip duration, system 100 may recommend a particular action, notify the particular vehicle operator, and/or take another action as deemed appropriate. Additionally, in some implementations, comparison component 118 may determine the change in performance between the most recent peak at a mark 42d and mark 42b, representing roughly a 20% drop in about 75 minutes. Such a change may be the basis for a particular action or recommendation. In some implementations, the rate of change of the performance may be determined (i.e., the slope at the 4-hour mark), at such a rate may be the basis for a particular action or recommendation, even though the absolute performance value at 4 hours is above first threshold level 40d.

Referring to FIG. 1, action component 120 may be configured to determine whether to take an action based on one or more determinations and/or comparisons. For example, action component 120 may determine whether to schedule a break (or take another action) for a particular vehicle operator based on a comparison by comparison component 118. For example, action component 120 may determine whether to schedule a break (or take another action) for a particular vehicle operator based on a determination by performance component 116. In some implementations, action component 120 may determine whether to schedule a break (or take another action) based on a combination of multiple determinations and comparisons. Actions taken or recommended by action component 120 may include generating notifications, providing notifications (e.g., notifying a vehicle operator, a stakeholder of a particular fleet, a dispatcher, remote computing server 125, and/or others), scheduling a rest or break, modifying the planned route, modifying the effective speed limit for a particular vehicle, modifying the type of vehicle events a particular vehicle is currently detecting, modifying the sensitivity with which a particular vehicle event is being detected, and/or other actions.

Notification component 122 may be configured to generate notifications, including but not limited to notifications regarding recommended or taken actions (by action component 120), detected vehicle events, and/or other operations performed by system 100. In some implementations, notification component 122 may be configured to transfer and/or otherwise provide notifications to one or more of a vehicle operator of vehicle 12, remote computing server 125, one or more manual reviewers, one or more fleet managers, one or more supervisors of the vehicle operator of vehicle 12, and/or other stakeholders. In some implementations, notification component 122 may be configured to generate reports that include information, e.g., regarding detected vehicle events. For example, notification component 122 may be configured to provide a notification to the vehicle operator of vehicle 12 (e.g., through a user interface within vehicle 12, or through a client computing device associated with the vehicle operator) that warns or notifies the vehicle operator regarding a recommended action and/or provides a suggestion to park vehicle 12 for a break.

Referring to FIG. 1, detection component 124 may be configured to detect vehicle events, including but not limited to vehicle events of vehicle 12. In some implementations, detections by detection component 124 may be based on one or more of the current operation of vehicle 12, information pertaining to vehicle 12, current parameters of vehicle 12, road-specific information, determinations by other components of system 100, and/or other factors, as well as combinations thereof. For example, detection component 124 may be configured to detect occurrences of vehicle events responsive to the current speed of a particular vehicle exceeding the current speed threshold for that particular vehicle in its current vehicle location. In some implementations, operations by detection component 124 may be vehicle-specific. In some implementations, operations by detection component 124 may be performed locally, at individual vehicles. In some implementations, detection component 124 may be configured to determine parameters. For example, the parameters may pertain to the operation of vehicle 12, the current speed of vehicle 12, the current location of vehicle 12, the context of or pertaining to vehicle 12, environmental conditions in or near vehicle 12, and/or other parameters. In some implementations, parameters may be based on obtained information. The obtained information may include one or more of output signals generated by set of sensors 108, parameters based on output signals generated by set of sensors 108, information from external resources 130, and/or other information. For example, in some implementations, detection component 124 may be configured to obtain output signals from set of sensors 108 that convey information pertaining to vehicle 12 and to the operation of vehicle 12, and further configured to determine a current speed of vehicle 12 based on the obtained output signals, and even further configured to determine whether a speeding event has occurred (or is occurring in real-time).

Client computing platforms 104 may be associated with user interfaces 134. User interfaces 134 may be presented to users 135, including but not limited to vehicle operators, vehicle owners, fleet managers, and/or other stakeholders. In some implementations, notifications (e.g., from notification component 122) may be provided through one or more user interfaces 134 in one or more vehicles. In some implementations, an individual user interface 134 may include one or more controllers, joysticks, track pad, a touch screen, a keypad, touch sensitive and/or physical buttons, switches, buttons, a keyboard, knobs, levers, a display, speakers, a microphone, an indicator light, a printer, and/or other interface devices. User interfaces 134 may be configured to facilitate interaction between users 135 and system 100, including but not limited to receiving input from users 135 and providing notifications and/or recommendations to users 135. In some implementations, received input may, e.g., be used to select how to determine the current speed threshold, or how to detect vehicle events.

In some implementations, server(s) 102, client computing platform(s) 104, and/or external resources 130 may be operatively linked via one or more electronic communication links. For example, such electronic communication links may be established, at least in part, via one or more network(s) 13 such as the Internet and/or other networks. It will be appreciated that this is not intended to be limiting, and that the scope of this disclosure includes implementations in which server(s) 102, client computing platform(s) 104, and/or external resources 130 may be operatively linked via some other communication media.

A given client computing platform 104 may include one or more processors configured to execute computer program components. The computer program components may be configured to enable an expert or user associated with the given client computing platform 104 to interface with system 100 and/or external resources 130, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, and/or other computing platforms.

External resources 130 may include sources of information outside of system 100, external entities participating with system 100, and/or other resources. In some implementations, some or all of the functionality attributed herein to external resources 130 may be provided by resources included in system 100.

Remote computing server 125 may be separate, discrete, and/or distinct from individual vehicles (such as vehicle 12), and/or system 100. In some implementations, remote computing server 125 may be configured to receive, analyze, and/or otherwise process information from one of more vehicles, including but not limited to vehicle 12. In some implementations, remote computing server 125 may be configured to receive notifications from vehicle 12.

Server(s) 102 may include electronic storage 126, one or more processors 132, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 126 may comprise non-transitory storage media that electronically stores information. The electronic storage media of electronic storage 126 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 126 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 126 may include one or more virtual storage resources (e.g., cloud storage, a virtual private network, and/or other virtual storage resources). Electronic storage 126 may store software algorithms, information determined by processor(s) 132, information received from server(s) 102, information received from client computing platform(s) 104, and/or other information that enables server(s) 102 to function as described herein.

Processor(s) 132 may be configured to provide information processing capabilities in server(s) 102. As such, processor(s) 132 may include one or more of a digital processor, an analog processor, a digital circuit designed to process information, an analog circuit designed to process information, a state machine, and/or other mechanisms for electronically processing information. Although processor(s) 132 is shown in FIG. 1 as a single entity, this is for illustrative purposes only. In some implementations, processor(s) 132 may include a plurality of processing units. These processing units may be physically located within the same device, or processor(s) 132 may represent processing functionality of a plurality of devices operating in coordination. Processor(s) 132 may be configured to execute components 110, 112, 114, 116, 118, 120, 122, and/or 124, and/or other components. Processor(s) 132 may be configured to execute components 110, 112, 114, 116, 118, 120, 122, and/or 124, and/or other components by software; hardware; firmware; some combination of software, hardware, and/or firmware; and/or other mechanisms for configuring processing capabilities on processor(s) 132. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 110, 112, 114, 116, 118, 120, 122, and/or 124 are illustrated in FIG. 1 as being implemented within a single processing unit, in implementations in which processor(s) 132 includes multiple processing units, one or more of components 110, 112, 114, 116, 118, 120, 122, and/or 124 may be implemented remotely from the other components. The description of the functionality provided by the different components 110, 112, 114, 116, 118, 120, 122, and/or 124 described below is for illustrative purposes, and is not intended to be limiting, as any of components 110, 112, 114, 116, 118, 120, 122, and/or 124 may provide more or less functionality than is described. For example, one or more of components 110, 112, 114, 116, 118, 120, 122, and/or 124 may be eliminated, and some or all of its functionality may be provided by other ones of components 110, 112, 114, 116, 118, 120, 122, and/or 124. As another example, processor(s) 132 may be configured to execute one or more additional components that may perform some or all of the functionality attributed below to one of components 110, 112, 114, 116, 118, 120, 122, and/or 124.

Figure 2:
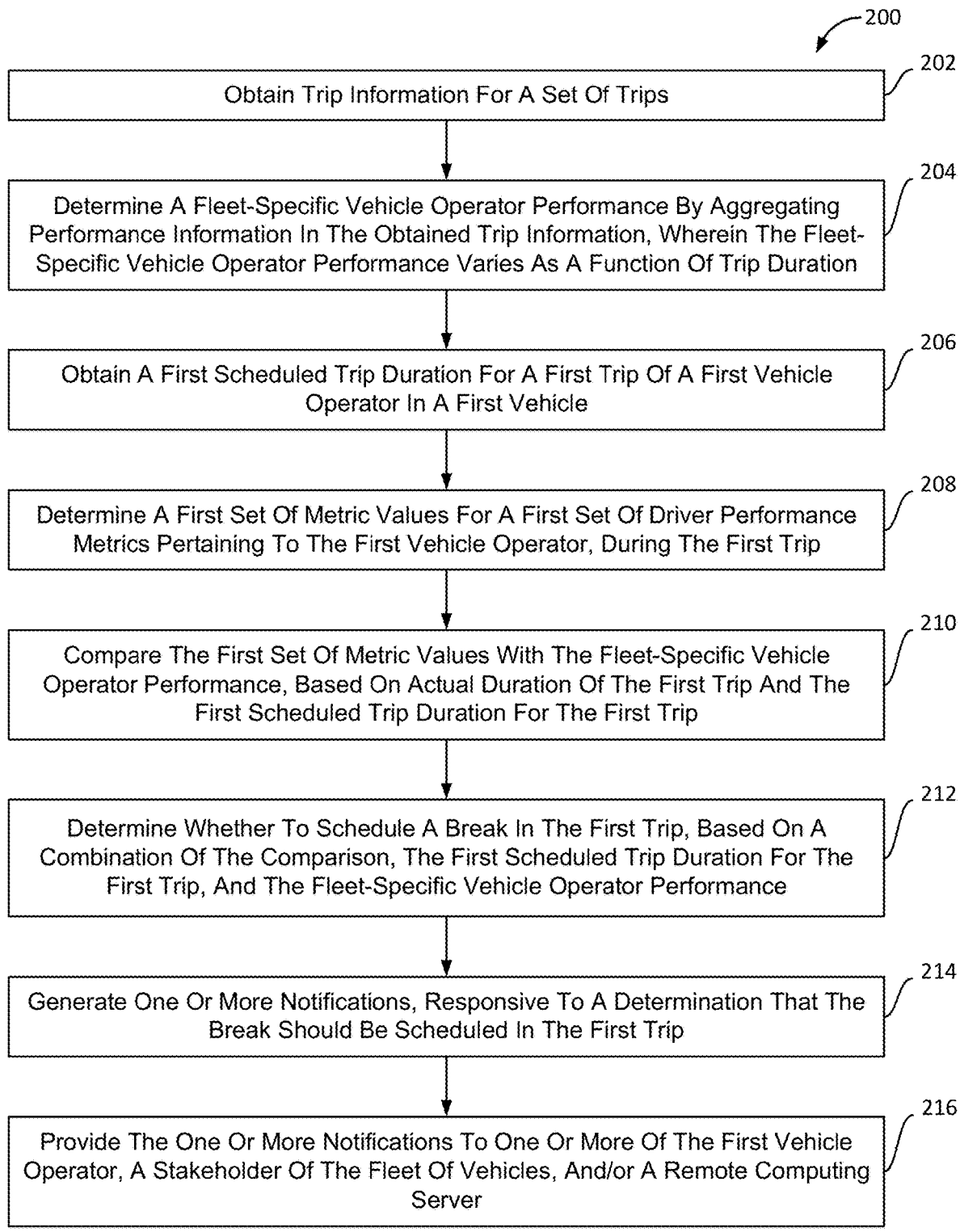
FIGS. 2-3 illustrate methods for determining and using fleet-specific vehicle operator performance for a set of vehicle operators, in accordance with different implementations.
Figure 3:
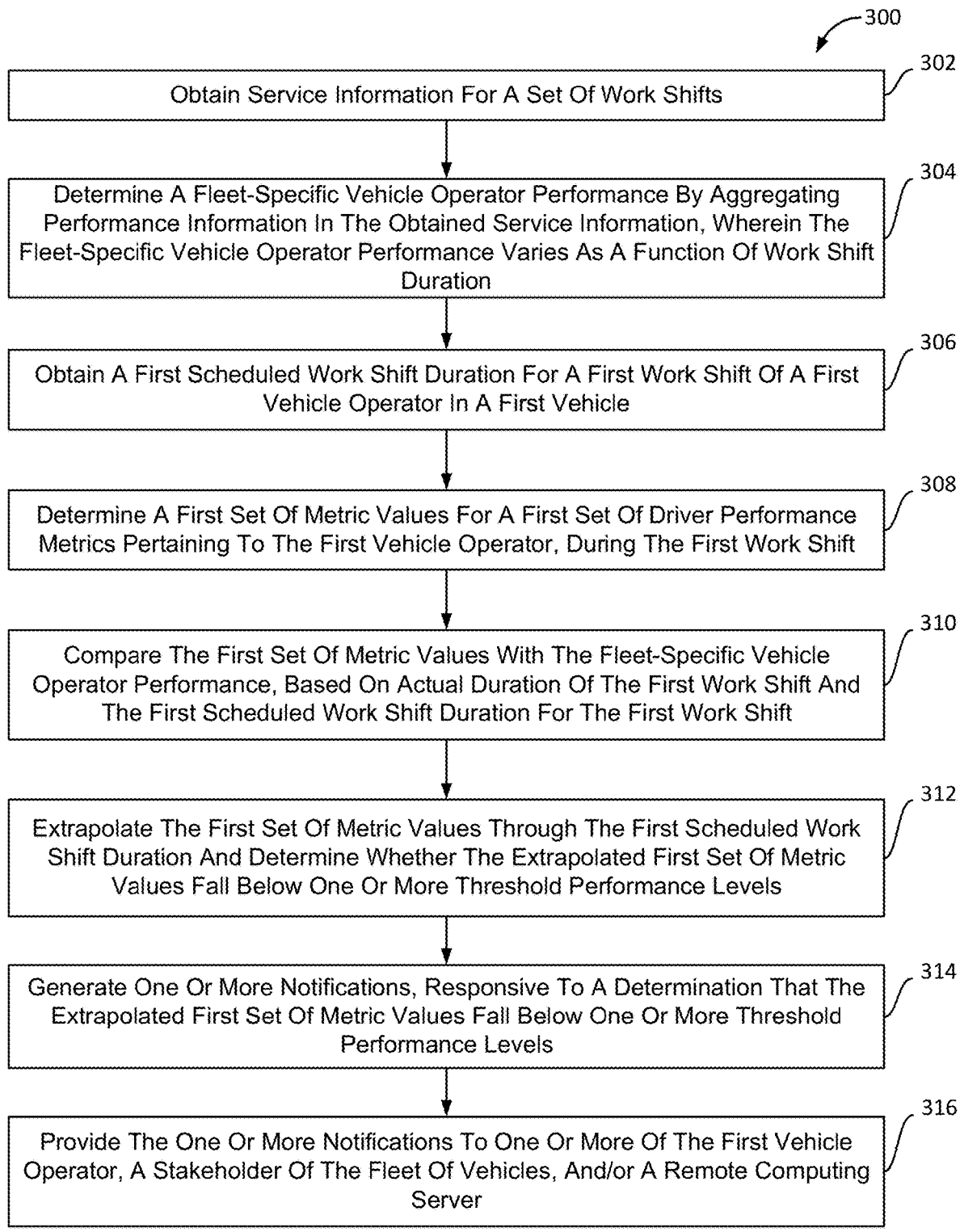

FIG. 2 and FIG. 3 illustrate a method 200 and a method 300 for determining and using fleet-specific vehicle operator performance for a set of vehicle operators, in accordance with one or more implementations. The operations of methods 200 and 300 presented below are intended to be illustrative. In some implementations, methods 200 and 300 may be accomplished with one or more additional operations not described, and/or without one or more of the operations discussed. Additionally, the order in which the operations of methods 200 and 300 are illustrated in FIG. 2 and FIG. 3 and described below is not intended to be limiting.

In some implementations, method 200 and/or method 300 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 and/or method 300 in response to instructions stored electronically on an electronic storage medium. The one or more processing devices may include one or more devices configured through hardware, firmware, and/or software to be specifically designed for execution of one or more of the operations of method 200 and/or method 300.

Regarding method 200, at an operation 202, trip information is obtained for a set of trips. The trip information for an individual trip in the set of trips includes (i) an operator identifier that identifies an individual vehicle operator from the set of vehicle operators, (ii) a vehicle identifier that identifies an individual vehicle from the fleet of vehicles, (iii) an individual trip duration for the individual trip, and (iv) performance information that represents one or more metric values for one or more driver performance metrics pertaining to the individual vehicle operator throughout the individual trip duration in the individual vehicle. In some embodiments, operation 202 is performed by an obtainment component the same as or similar to obtainment component 110 (shown in FIG. 1 and described herein).

At an operation 204, the fleet-specific vehicle operator performance is determined by aggregating the performance information in the obtained trip information. The fleet-specific vehicle operator performance varies as a function of trip duration. In some embodiments, operation 204 is performed by an aggregation component the same as or similar to aggregation component 112 (shown in FIG. 1 and described herein).

At an operation 206, a first scheduled trip duration is obtained for a first trip of the first vehicle operator in the first vehicle. In some embodiments, operation 206 is performed by a service component the same as or similar to service component 114 (shown in FIG. 1 and described herein).

At an operation 208, a first set of metric values is determined for a first set of driver performance metrics pertaining to the first vehicle operator, during the first trip. In some embodiments, operation 208 is performed by a performance component the same as or similar to performance component 116 (shown in FIG. 1 and described herein).

At an operation 210, the first set of metric values is compared with the fleet-specific vehicle operator performance, based on actual duration of the first trip and the first scheduled trip duration for the first trip. In some embodiments, operation 210 is performed by a comparison component the same as or similar to comparison component 118 (shown in FIG. 1 and described herein).

At an operation 212, it is determined whether to schedule a break in the first trip, based on a combination of the comparison, the first scheduled trip duration for the first trip, and the fleet-specific vehicle operator performance. In some embodiments, operation 212 is performed by an action component the same as or similar to action component 120 (shown in FIG. 1 and described herein).

At an operation 214, one or more notifications are generated, responsive to a determination that the break should be scheduled in the first trip. In some embodiments, operation 214 is performed by a notification component the same as or similar to notification component 122 (shown in FIG. 1 and described herein).

At an operation 216, the one or more notifications are provided to one or more of the first vehicle operator, a stakeholder of the fleet of vehicles, and/or a remote computing server. In some embodiments, operation 216 is performed by a notification component the same as or similar to notification component 122 (shown in FIG. 1 and described herein).

Regarding method 300, at an operation 302, service information is obtained for a set of work shifts. The service information for an individual work shift in the set of work shifts includes (i) an operator identifier that identifies an individual vehicle operator from the set of vehicle operators, (ii) a vehicle identifier that identifies an individual vehicle from the fleet of vehicles, (iii) an individual work shift duration for the individual work shift, and (iv) performance information that represents one or more metric values for one or more driver performance metrics pertaining to the individual vehicle operator throughout the individual work shift duration in the individual vehicle. In some embodiments, operation 302 is performed by an obtainment component the same as or similar to obtainment component 110 (shown in FIG. 1 and described herein).

At an operation 304, the fleet-specific vehicle operator performance is determined by aggregating the performance information in the obtained service information. The fleet-specific vehicle operator performance varies as a function of work shift duration. In some embodiments, operation 304 is performed by an aggregation component 112 the same as or similar to aggregation component 112 (shown in FIG. 1 and described herein).

At an operation 306, a first scheduled work shift duration is obtained for a first work shift of the first vehicle operator in the first vehicle. In some embodiments, operation 306 is performed by a service component the same as or similar to service component 114 (shown in FIG. 1 and described herein).

At an operation 308, a first set of metric values is determined for a first set of driver performance metrics pertaining to the first vehicle operator, during the first work shift. In some embodiments, operation 308 is performed by a performance component the same as or similar to performance component 116 (shown in FIG. 1 and described herein).

At an operation 310, the first set of metric values is compared with the fleet-specific vehicle operator performance, based on actual duration of the first work shift and the first scheduled work shift duration for the first work shift. In some embodiments, operation 310 is performed by a comparison component the same as or similar to comparison component 118 (shown in FIG. 1 and described herein).

At an operation 312, the first set of metric values is extrapolated through the first scheduled work shift duration, and it is determined whether the extrapolated first set of metric values fall below one or more threshold performance levels. In some embodiments, operation 312 is performed by a comparison component and/or an action component the same as or similar to comparison component 118 and/or action component 120 (shown in FIG. 1 and described herein).

At an operation 314, responsive to a determination that the extrapolated first set of metric values fall below one or more threshold performance levels, one or more notifications are generated. In some embodiments, operation 314 is performed by a notification component the same as or similar to notification component 122 (shown in FIG. 1 and described herein).

At an operation 316, the one or more notifications are provided to one or more of the first vehicle operator, a stakeholder of the fleet of vehicles, and/or a remote computing server. In some embodiments, operation 316 is performed by a notification component the same as or similar to notification component 122 (shown in FIG. 1 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured for determining and using fleet-specific vehicle operator performance for a set of vehicle operators to schedule breaks, wherein the fleet-specific vehicle operator performance is specific to a fleet of vehicles, wherein the fleet of vehicles is operated by the set of vehicle operators including multiple vehicle operators, wherein the fleet of vehicles includes a first vehicle operated by a first vehicle operator, the system comprising:
   one or more hardware processors configured by machine-readable instructions to:
      obtain trip information for a set of trips, wherein the trip information for an individual trip in the set of trips includes:
         (i) an operator identifier that identifies an individual vehicle operator from the set of vehicle operators,
         (ii) a vehicle identifier that identifies an individual vehicle from the fleet of vehicles,
         (iii) an individual trip duration for the individual trip, ranging from a start of the individual trip to an end of the individual trip,
         (iv) performance information that represents one or more metric values for one or more driver performance metrics pertaining to the individual vehicle operator throughout the individual trip duration in the individual vehicle;
      determine, by the one or more hardware processors, a fleet-specific vehicle operator performance function by aggregating the performance information in the obtained trip information for the set of vehicle operators, wherein the fleet-specific vehicle operator performance function varies as a function of time spent driving by the set of vehicle operators during a given trip such that the fleet-specific vehicle operator performance at the start of the given trip is greater than the fleet-specific vehicle operator performance at the end of the given trip, and wherein the fleet-specific vehicle operator performance function is specific to the set of vehicle operators that operate the fleet of vehicles;
      obtain, by the one or more hardware processors, a first scheduled trip duration for a first trip of the first vehicle operator in the first vehicle;
      during the first trip, continuously determine, by a performance component executed by the one or more hardware processors, a first set of metric values for a first set of driver performance metrics pertaining to the first vehicle operator, wherein the first set of metric values is associated with a first amount of time currently spent driving so far by the first vehicle operator during the first trip such that the first set of metric values is updated over time during the first trip;
      during the first trip, continuously determine, by the performance component executed by the one or more hardware processors, a rate of change for the first set of metric values during the first trip;
      during the first trip, continuously extrapolate the first set of metric values for the first vehicle operator based on the rate of change for the first set of metric values and a remaining duration of the first scheduled trip duration;
      during the first trip, compare, by a comparison component executed by the one or more hardware processors, the first set of metric values as extrapolated against the fleet-specific vehicle operator performance function;
      during the first trip, schedule, by the one or more hardware processors, a break during the first scheduled trip duration for the first vehicle operator, based on a combination of the comparison, the remaining duration of the first scheduled trip duration for the first trip, and the fleet-specific vehicle operator performance function, wherein scheduling the break includes modifying a planned route for the first trip to include the scheduled break;
      during the first trip, generate, by the one or more hardware processors, one or more notifications regarding the modified planned route during the first trip, modify, by the one or more hardware processors, an effective speed limit for the first vehicle; and
      electronically transfer the one or more notifications to one or more of a client computing platform associated with the first vehicle operator, to a stakeholder of the fleet of vehicles, and/or to a remote computing server, and subsequently present the one or more notifications on one or more user interfaces associated with one or more of the client computing platform of the first vehicle operator, the stakeholder of the fleet of vehicles, and/or the remote computing server.

2. The system of claim 1, wherein the set of trips includes a first particular trip of a first particular vehicle, wherein the performance information for the first particular trip is based at least in part on a first set of vehicle events that have been detected, wherein detection of the first set of vehicle events is based on output signals generated by a set of sensors that are carried by the first particular vehicle.

3. The system of claim 1, wherein the set of trips includes a second particular trip of a second particular vehicle that is operated by a second particular vehicle operator, wherein the performance information for the second particular trip is based at least in part on operator attentiveness of the second particular vehicle operator, wherein determination of the operator attentiveness is based on output signals captured by one or more cameras configured to capture image information of the second particular vehicle operator during operation of the second particular vehicle throughout the second particular trip.

4. The system of claim 1, wherein the set of trips includes a third particular trip of a third particular vehicle that is operated by a third particular vehicle operator, wherein the performance information for the third particular trip is based on a combination of detected vehicle events and determined operator attentiveness of the third particular vehicle operator.

5. The system of claim 1, wherein the fleet of vehicles includes a second vehicle operated by a second vehicle operator and a third vehicle operated by a third vehicle operator, wherein the one or more hardware processors are further configured to:
  during a second trip of the second vehicle operator, continuously determine a second set of metric values for a second set of driver performance metrics pertaining to the second vehicle operator;
  during the second trip, continuously determine a second rate of change for the second set of metric values;
  during the second trip, extrapolate the second set of metric values based on the second rate of change for the second set of metric values;
  during the second trip, compare the second set of metric values as extrapolated against the fleet-specific vehicle operator performance function;
  during a third trip of the third vehicle operator, continuously determine a third set of metric values for a third set of driver performance metrics pertaining to the third vehicle operator;
  during the third trip, continuously determine a third rate of change for the third set of metric values;
  during the third trip, extrapolate the third set of metric values based on the third rate of change for the third set of metric values; and
  during the third trip, compare the third set of metric values as extrapolated against the fleet-specific vehicle operator performance function.

6. The system of claim 1, wherein determining whether to schedule a break includes:
  extrapolating the first set of metric values through the first scheduled trip duration and determining whether the extrapolated first set of metric values falls below one or more threshold performance levels.

7. The system of claim 1, wherein the trip information includes information regarding individual vehicle types, wherein comparing the first set of metric values with the fleet-specific vehicle operator performance is limited to the individual vehicle types that are similar to a first vehicle type of the first vehicle.

8. The system of claim 1, wherein determining a length of the break is based on hours-of-service (HOS) information for the first vehicle operator.

9. A method for determining and using fleet-specific vehicle operator performance for a set of vehicle operators to schedule breaks, wherein the fleet-specific vehicle operator performance is specific to a fleet of vehicles, wherein the fleet of vehicles is operated by the set of vehicle operators, wherein the fleet of vehicles includes a first vehicle operated by a first vehicle operator, the method comprising:
  obtaining trip information for a set of trips, wherein the trip information for an individual trip in the set of trips includes (i) an operator identifier that identifies an individual vehicle operator from the set of vehicle operators, (ii) a vehicle identifier that identifies an individual vehicle from the fleet of vehicles, (iii) an individual trip duration for the individual trip, ranging from a start of the individual trip to an end of the individual trip, and (iv) performance information that represents one or more metric values for one or more driver performance metrics pertaining to the individual vehicle operator throughout the individual trip duration in the individual vehicle;
  determining a fleet-specific vehicle operator performance function by aggregating the performance information in the obtained trip information for the set of vehicle operators, wherein the fleet-specific vehicle operator performance function varies as a function of time spent driving by the set of vehicle operators during a given trip such that the fleet-specific vehicle operator performance at the start of the given trip is greater than the fleet-specific vehicle operator performance at the end of the given trip, and wherein the fleet-specific vehicle operator performance function is specific to the set of vehicle operators that operate the fleet of vehicles;
  obtaining a first scheduled trip duration for a first trip of the first vehicle operator in the first vehicle;
  during the first trip, continuously determining a first set of metric values for a first set of driver performance metrics pertaining to the first vehicle operator, wherein the first set of metric values is associated with a first amount of time currently spent driving so far by the first vehicle operator during the first trip such that the first set of metric values is updated over time during the first trip;
  during the first trip, continuously determining a rate of change for the first set of metric values during the first trip;
  during the first trip, continuously extrapolating the first set of metric values for the first vehicle operator based on the rate of change for the first set of metric values and a remaining duration of the first scheduled trip duration;
  during the first trip, comparing the first set of metric values as extrapolated against the fleet-specific vehicle operator performance function;
  during the first trip, scheduling a break during the first scheduled trip duration for the first vehicle operator, based on a combination of the comparison, the remaining duration of the first scheduled trip duration for the first trip, and the fleet-specific vehicle operator performance function, wherein scheduling the break include modifying a planned route for the first trip to include the scheduled break;
  during the first trip, generating one or more notifications regarding the modified planned route during the first trip, modifying an effective speed limit for the first vehicle; and
  electronically transferring the one or more notifications to one or more of a client computing platform associated with the first vehicle operator, to a stakeholder of the fleet of vehicles, and/or to a remote computing server, and subsequently presenting the one or more notifications on one or more user interface associated with one or more of the client computing platform of the first vehicle operator, the stakeholder of the fleet of vehicles, and/or the remote computing server.

10. The method of claim 9, wherein the set of trips includes a first particular trip of a first particular vehicle, wherein the performance information for the first particular trip is based at least in part on a first set of vehicle events that have been detected, wherein detection of the first set of vehicle events is based on output signals generated by a set of sensors that are carried by the first particular vehicle.

11. The method of claim 9, wherein the set of trips includes a second particular trip of a second particular vehicle that is operated by a second particular vehicle operator, wherein the performance information for the second particular trip is based at least in part on operator attentiveness of the second particular vehicle operator, wherein determination of the operator attentiveness is based on output signals captured of the second particular vehicle operator by one or more cameras during operation of the second particular vehicle throughout the second particular trip.

12. The method of claim 9, wherein the set of trips includes a third particular trip of a third particular vehicle that is operated by a third particular vehicle operator, wherein the performance information for the third particular trip is based on a combination of detected vehicle events and determined operator attentiveness of the third particular vehicle operator.

13. The method of claim 9, wherein the fleet of vehicles includes a second vehicle operated by a second vehicle operator and a third vehicle operated by a third vehicle operator, the method further comprising:
  during a second trip of the second vehicle operator, continuously determining a second set of metric values for a second set of driver performance metrics pertaining to the second vehicle operator;
  during the second trip, continuously determining a second rate of change for the second set of metric values;
  during the second trip, extrapolating the second set of metric values based on the second rate of change for the second set of metric values;
  during the second trip, comparing the second set of metric values as extrapolated against the fleet-specific vehicle operator performance function;
  during a third trip of the third vehicle operator, continuously determining a third set of metric values for a third set of driver performance metrics pertaining to the third vehicle operator;
  during the third trip, continuously determining a third rate of change for the third set of metric values;
  during the third trip, extrapolating the third set of metric values based on the third rate of change for the third set of metric values; and
  during the third trip, comparing the third set of metric values as extrapolated against the fleet-specific vehicle operator performance function.

14. The method of claim 9, wherein determining whether to schedule a break includes:
  extrapolating the first set of metric values through the first scheduled trip duration and determining whether the extrapolated first set of metric values falls below one or more threshold performance levels.

15. The method of claim 9, wherein the trip information includes information regarding individual vehicle types, wherein comparing the first set of metric values with the fleet-specific vehicle operator performance is limited to the individual vehicle types that are similar to a first vehicle type of the first vehicle.

16. The method of claim 9, wherein determining a length of the break is based on hours-of-service (HOS) information for the first vehicle operator.

17. A system configured for determining and using fleet-specific vehicle operator performance for a set of vehicle operators to schedule breaks, wherein a fleet of vehicles is operated by the set of vehicle operators, wherein the fleet of vehicles includes a first vehicle operated by a first vehicle operator, the system comprising:
  one or more hardware processors configured by machine-readable instructions to:
    obtain service information for a set of work shifts, wherein the service information for an individual work shift in the set of work shifts includes:
      (i) an operator identifier that identifies an individual vehicle operator from the set of vehicle operators,
      (ii) a vehicle identifier that identifies an individual vehicle from the fleet of vehicles,
      (iii) an individual work shift duration for the individual work shift, ranging from a start of the individual work shift to an end of the individual work shift, and
      (iv) performance information that represents one or more metric values for one or more driver performance metrics pertaining to the individual vehicle operator throughout the individual work shift duration in the individual vehicle;
    determine a fleet-specific vehicle operator performance function by aggregating the performance information in the obtained service information for the set of vehicle operators, wherein the fleet-specific vehicle operator performance function varies as a function of work shift duration such that the fleet-specific vehicle operator performance at the start of the individual work shift is greater than the fleet-specific vehicle operator performance at the end of the individual work shift, and wherein the fleet-specific vehicle operator performance function is specific to the set of vehicle operators that operate the fleet of vehicles;
    obtain a first scheduled work shift duration for a first work shift of the first vehicle operator in the first vehicle;
    during the first work shift, continuously determine a first set of metric values for a first set of driver performance metrics pertaining to the first vehicle operator such that the first set of metric values is updated over time during the first work shift;
    during the first work shift, continuously determine a rate of change for the first set of metric values during the first work shift;
    during the first work shift, continuously extrapolate the first set of metric values for the first vehicle operator based on the rate of change for the first set of metric values and a remaining duration of the first scheduled work shift duration;
    during the first work shift, compare the first set of metric values as extrapolated against the fleet-specific vehicle operator performance function;
    during the first work shift and based on the comparison, schedule a break during the first scheduled work shift duration for the first work shift, wherein scheduling the break includes modifying a planned route for the first work shift to include the scheduled break;
    during the first work shift, generate one or more notifications regarding the modified planned route during the first work shift, modify an effective speed limit for the first vehicle; and electronically transfer the one or more notifications to one or more of a client computing platform associated with the first vehicle operator, to a stakeholder of the fleet of vehicles, and/or to a remote computing server, and subsequently present the one or more notifications on one or more user interface associated with one or more of the client computing platform of the first vehicle operator, the stakeholder of the fleet of vehicles, and/or the remote computing server.

18. A method for determining and using fleet-specific vehicle operator performance for a set of vehicle operators to schedule breaks, wherein a fleet of vehicles is operated by the set of vehicle operators, wherein the fleet of vehicles includes a first vehicle operated by a first vehicle operator, the system comprising:

obtaining service information for a set of work shifts, wherein the service information for an individual work shift in the set of work shifts includes (i) an operator identifier that identifies an individual vehicle operator from the set of vehicle operators, (ii) a vehicle identifier that identifies an individual vehicle from the fleet of vehicles, (iii) an individual work shift duration for the individual work shift, ranging from a start of the individual work shift to an end of the individual work shift, and (iv) performance information that represents one or more metric values for one or more driver performance metrics pertaining to the individual vehicle operator throughout the individual work shift duration in the individual vehicle;

determining a fleet-specific vehicle operator performance function by aggregating the performance information in the obtained service information for the set of vehicle operators, wherein the fleet-specific vehicle operator performance function varies as a function of work shift duration such that the fleet-specific vehicle operator performance at the start of the individual work shift is greater than the fleet-specific vehicle operator performance at the end of the individual work shift, and wherein the fleet-specific vehicle operator performance function is specific to the set of vehicle operators that operate the fleet of vehicles;

obtaining a first scheduled work shift duration for a first work shift of the first vehicle operator in the first vehicle;

during the first work shift, continuously determining a first set of metric values for a first set of driver performance metrics pertaining to the first vehicle operator such that the first set of metric values is updated over time during the first work shift;

during the first work shift, continuously determining a rate of change for the first set of metric values during the first work shift;

during the first work shift, continuously extrapolating the first set of metric values for the first vehicle operator based on the rate of change for the first set of metric values and a remaining duration of the first scheduled work shift duration;

during the first work shift, comparing the first set of metric values as extrapolated against the fleet-specific vehicle operator performance function;

during the first work shift and based on the comparison, scheduling a break during the first scheduled work shift duration for the first work shift, wherein scheduling the break includes modifying a planned route for the first work shift to include the scheduled break;

during the first work shift, generating one or more notifications regarding the modified planned route during the first work shift, modifying an effective speed limit for the first vehicle; and electronically transferring the one or more notifications to one or more of a client computing platform associated with the first vehicle operator, to a stakeholder of the fleet of vehicles, and/or to a remote computing server, and subsequently presenting the one or more notifications on one or more user interface associated with one or more of the client computing platform of the first vehicle operator, the stakeholder of the fleet of vehicles, and/or the remote computing server.

* * * * *